United States Patent
Heyman et al.

(10) Patent No.: US 8,976,210 B2
(45) Date of Patent: Mar. 10, 2015

(54) METHOD FOR DISPLAYING A REMOTE DESKTOP ON A PORTABLE TOUCH SCREEN DEVICE

(71) Applicant: Ericom Software Ltd., Jerusalem (IL)

(72) Inventors: Eran Heyman, Closter, NJ (US); Dan Shappir, Tel Aviv (IL)

(73) Assignee: Ericom Software Ltd., Jerusalem (IL)

(*) Notice: Subject to any disclaimer, the term of this patent is extended or adjusted under 35 U.S.C. 154(b) by 0 days.

(21) Appl. No.: 13/888,417

(22) Filed: May 7, 2013

(65) Prior Publication Data

US 2014/0267090 A1     Sep. 18, 2014

Related U.S. Application Data

(63) Continuation of application No. 13/798,438, filed on Mar. 13, 2013.

(51) Int. Cl.
*H04N 7/01* (2006.01)
*G06F 3/041* (2006.01)
*G06T 5/00* (2006.01)

(52) U.S. Cl.
CPC .. *G06F 3/041* (2013.01); *G06T 5/00* (2013.01)
USPC ........... 345/698; 345/173; 345/699; 345/204; 345/156; 710/5; 707/609; 715/700; 715/210

(58) Field of Classification Search
USPC .................. 345/156, 170, 690, 698; 707/609; 710/5; 715/700
See application file for complete search history.

(56) References Cited

U.S. PATENT DOCUMENTS

| | | | | |
|---|---|---|---|---|
| 6,262,763 B1 * | 7/2001 | Totsuka et al. | | 348/135 |
| 6,670,964 B1 * | 12/2003 | Ward et al. | | 345/660 |
| 8,531,487 B2 * | 9/2013 | Snow | | 345/660 |
| 8,572,025 B2 * | 10/2013 | Smolinski et al. | | 707/609 |
| 2002/0140626 A1 * | 10/2002 | Chang | | 345/1.1 |
| 2005/0024392 A1 * | 2/2005 | Lee | | 345/698 |
| 2005/0190203 A1 * | 9/2005 | Gery et al. | | 345/660 |
| 2008/0068289 A1 * | 3/2008 | Piasecki | | 345/2.1 |
| 2008/0079757 A1 * | 4/2008 | Hochmuth | | 345/698 |
| 2008/0226182 A1 * | 9/2008 | Ichieda | | 382/232 |
| 2009/0058884 A1 * | 3/2009 | Li et al. | | 345/660 |
| 2010/0023383 A1 * | 1/2010 | Aaltonen et al. | | 705/10 |
| 2011/0254865 A1 * | 10/2011 | Yee et al. | | 345/661 |
| 2012/0075204 A1 * | 3/2012 | Murray et al. | | 345/173 |
| 2012/0127207 A1 * | 5/2012 | Matas et al. | | 345/676 |
| 2013/0063455 A1 * | 3/2013 | Bayer et al. | | 345/522 |
| 2014/0043210 A1 * | 2/2014 | Stein et al. | | 345/2.1 |

* cited by examiner

*Primary Examiner* — Grant Sitta

(74) *Attorney, Agent, or Firm* — Mark M. Friedman

(57) ABSTRACT

A remote access application queries the client device for its display properties. Using the display properties of the client device and optionally the size of the fingertip of the user, a connection resolution for a remote desktop connection is determined. A remote desktop session is retrieved at the connection resolution and remote pixels are mapped to client pixels at a non-1:1 ratio. Remote desktop is then optionally resized to full screen.

16 Claims, 4 Drawing Sheets

FIG. 1 – PRIOR ART

METHOD FOR DISPLAYING A REMOTE DESKTOP ON A PORTABLE TOUCH SCREEN DEVICE

FIELD AND BACKGROUND OF THE INVENTION

The present invention relates generally to a remote access application for connecting a client device to a host computer in order to use applications stored on the host computer. The invention is particularly well-suited for portable client devices which feature a touch screen, such as a tablet, smartphone, or personal digital assistant (PDA), especially ones that feature a high resolution display like the Apple™ Retina™ display.

Remote presentation protocols, such as Remote Desktop Protocol (RDP), Independent Computing Architecture (ICA), PC-over-IP (PCoIP), and Virtual Network Computing (VNC) display portions of a remote virtual screen onto portions of the screen of a client device. This enables a user to view and interact with applications and documents that reside and operate on a remote device, also known as the host computer. A remote virtual screen is also known as a remote desktop or remote session. An application that resides on a client device and provides access to a remote desktop is known alternatively as a remote desktop application or remote access software. As such, those terms are used interchangeably herein, and any reference to a remote desktop or remote desktop application should be understood to include remote access software, whether it provides remote access to a whole desktop or to a single application.

The default behavior of most remote desktop applications is to display the remote session on the client device using a remote-local pixel ratio of 1:1, meaning one pixel of the remote desktop, i.e. the image returned by the host computer, will be displayed on the client device using one pixel of the client display. However on high resolution client devices such as tablets, smartphones and personal digital assistants (PDAs), the pixels are smaller and closer together in order to accommodate a greater number of pixels in the same physical space, enabling the device to produce higher quality images. If the remote desktop is displayed on a high resolution device using a 1:1 pixel ratio, the fonts and icons of the remote desktop will appear very small, and in some cases will also not occupy the entire screen of the client device.

When the fonts and icons of the remote desktop are displayed too small on the client device, it becomes difficult to see and interact with remote applications, i.e. the applications of the host computer which the user is accessing in the remote session. This is especially true in those client devices featuring a touch screen such as tablets based on the Android™ or iOS™ operating system, since a user needs to touch or tap parts of the displayed elements of the application with his or her finger in order to interact with the application. If the icon, or "touch target" as it is more commonly known on these devices, is significantly smaller than the size of the user's fingertip, it becomes difficult for the user to tap it without also inadvertently tapping neighboring touch targets, making for a frustrating user experience.

For example, a standard Microsoft Windows™ icon is 48×48 pixels in size. If a host computer running Windows™ has a 21" display with a resolution of 1920×1080 and a pixel density of 104.9 ppi (pixels per inch), the 48×48 pixel icon will measure approximately 0.45×0.45 inches on the host computer's screen. When a client device having a resolution of 2560×1600 and a pixel density of 300 ppi, for example the Google™ Nexus 10, connects to the same host computer using RDP and a remote-to-local pixel ratio of 1:1, the 48×48 pixel icon will measure only 0.16×0.16 inches on the client device screen, a fraction of the original size.

In order to overcome this difficulty, a user will usually be required to enlarge the image of the remote desktop or application by using a zoom gesture, i.e. two fingers sliding apart, until the fonts are easily read and touch targets are large enough to tap comfortably. However, when the remote display is zoomed, some elements of the remote desktop or application get pushed outside the viewable area of the client display, making it necessary to also use pan gestures, i.e. a swipe to the left, right, up or down, in order to bring the lost elements into view as needed. Working on a remote application using a high resolution client device requires the user to repeatedly zoom-in, pan, tap, and zoom-out while the user interacts with the different elements of the application. Obviously it would be desirable to provide remote access software which is specifically designed for small, yet high resolution client devices, which minimizes, to the extent possible, the number of zooms and pans required to interact comfortably with a remote application.

One solution known in the art is to offer the user the ability to change the default settings in the remote desktop application by prompting the user to enter a custom resolution for displaying the remote desktop, or by presenting the user a drop down list of resolution options. If a resolution lower than the client device's default, or native, resolution is specified, the client display will use more than one client pixel to display one remote pixel, resulting in a larger remote desktop and correspondingly larger touch targets. By experimenting with different resolution settings the user may be able to find a setting that displays the remote desktop with fonts and touch targets that are sized appropriately to be able to work comfortably, even if some zooming and panning are still required.

However this solution to the problem requires action and experimentation by the user. Furthermore, it requires a level of sophistication on the part of the user to recognize that a solution exists by playing with the settings. It is well recognized in software development that the average software user rarely changes the default settings of the software programs he or she uses.

Therefore, it would be advantageous to have a remote access application which would automatically and without user initiation display a remote desktop on a client device with fonts and touch targets sized appropriately for the user to work effectively.

SUMMARY OF THE INVENTION

According to the present invention there is provided a method for displaying a remote desktop on a client device including, by the client device: (a) determining, based on a physical resolution for the client device, a connection resolution for a remote desktop connection, (b) requesting a remote desktop connection at the connection resolution, (c) receiving, in response to the request, a remote desktop at the connection resolution, and (d) mapping pixels of the received remote desktop to pixels of the client device at a ratio other than 1:1, whereby the remote desktop is displayed on the client device.

Preferably, the pixels are mapped so that the remote desktop is displayed on the client device in an effective pixel density of 140 to 230 pixels per inch. Optionally, the method may further include resizing the remote desktop so that it fills substantially all of the display of the client device.

According to the present invention there is further provided a method for displaying a remote desktop on a touch screen client device including, by the client device: (a) determining a size of a fingertip of a user of the client device, (b) determining a connection resolution for a remote desktop connection, (c) requesting a remote desktop connection at the connection resolution, (d) receiving, in response to the request, a remote desktop at the connection resolution, and (e) mapping pixels of the received remote desktop to pixels of the client device at a ratio other than 1:1 such that a pixel rectangle (a special case of which is a square) of a predetermined size on the remote desktop, when mapped to pixels on the client device, has approximately the same dimensions as the fingertip, whereby the remote desktop is displayed on the client device.

Preferably, the pixels are mapped so that the remote desktop is displayed on the client device in an effective pixel density of 140 to 230 pixels per inch. Preferably, the size of the fingertip is determined by (i) instructing the user to touch the touch screen with a fingertip, thereby depressing a region of the touch screen, and (ii) measuring the size of the depressed region. Optionally, the method may further include resizing the remote desktop so that it fills substantially all of the display of the client device.

According to the present invention there is further provided a computer-readable storage medium having non-transient computer-readable code embodied on the computer-readable storage medium, the computer-readable code for displaying a remote desktop on a client device, the computer-readable code including a set of instructions that, when executed on the client device, causes the client device to: (a) determine, based on a physical resolution for the client device, a connection resolution to initiate a remote desktop connection, (b) request a remote desktop connection at the connection resolution, (c) receive, in response to the request, a remote desktop at the connection resolution, and (d) map pixels of the received remote desktop to pixels of the client device at a ratio other than 1:1.

Preferably, the computer-readable storage medium includes code that when executed causes the client device to map the pixels so that the remote desktop is displayed on the client device in an effective pixel density of 140 to 230 pixels per inch. Optionally, the computer-readable storage medium may include code to resize the remote desktop so that it fills substantially all of the display of the client device.

According to the present invention there is further provided a computer-readable storage medium having non-transient computer-readable code embodied on the computer-readable storage medium, the computer-readable code for displaying a remote desktop on a client device, the computer-readable code including a set of instructions that, when executed on the client device, causes the client device to: (a) determine a size of a fingertip of a user of the client device, (b) determine a connection resolution for a remote desktop connection, (c) request a remote desktop connection at the connection resolution, (d) receive, in response to the request, a remote desktop at the connection resolution, and (e) map pixels of the received remote desktop to pixels of the client device at a ratio other than 1:1 such that a pixel rectangle (a special case of which is a square) of a predetermined size on the remote desktop, when mapped to pixels on the client device, has approximately the same dimensions as the fingertip.

Preferably, the computer-readable storage medium includes code that when executed causes the client device to map the pixels so that the remote desktop is displayed on the client device in an effective pixel density of 140 to 230 pixels per inch, and determines the fingertip size by (i) instructing the user to touch the touch screen with a fingertip, thereby depressing a region of the touch screen, and (ii) measuring the size of the depressed region. Optionally, it may further include code that resizes the remote desktop so that it fills substantially all of the display of the client device.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of the method for displaying a remote desktop on a client device according to the present invention may be better understood with reference to the drawings and the accompanying description.

In the following description, "remote desktop application" is an application for remotely accessing a host computer, while "remote desktop" refers to the graphical user interface which is returned to the user of the client device and can include a complete desktop or a single application. An "icon" refers to any clickable element of a graphical user interface, such as a Windows™ desktop. A "touch target" is any interactive element of an application on a touch screen device which the user can tap to register input. Icons on the host computer become touch targets on the client device. As such, the terms "icon" and "touch target" are used interchangeably herein.

Figure 1:
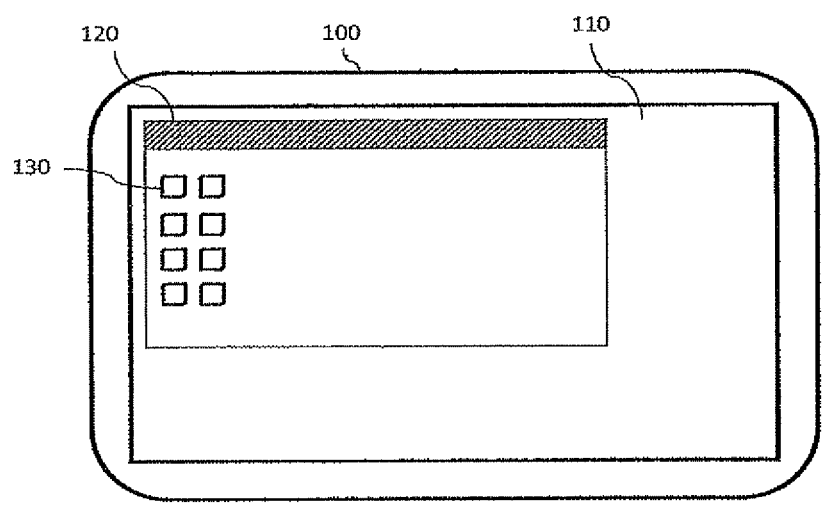
FIG. 1 is frontal view of a tablet client device displaying a remote desktop according to the prior art.

Referring now to the drawings, FIG. 1 illustrates the prior art. A tablet client device 100 having a display 110 displays a remote desktop 120 at its native resolution, i.e. pixel density, which is higher than the resolution of the host computer. As a result, remote desktop 120 occupies only a portion of display 110, and touch targets 130 appear small.

Figure 2:
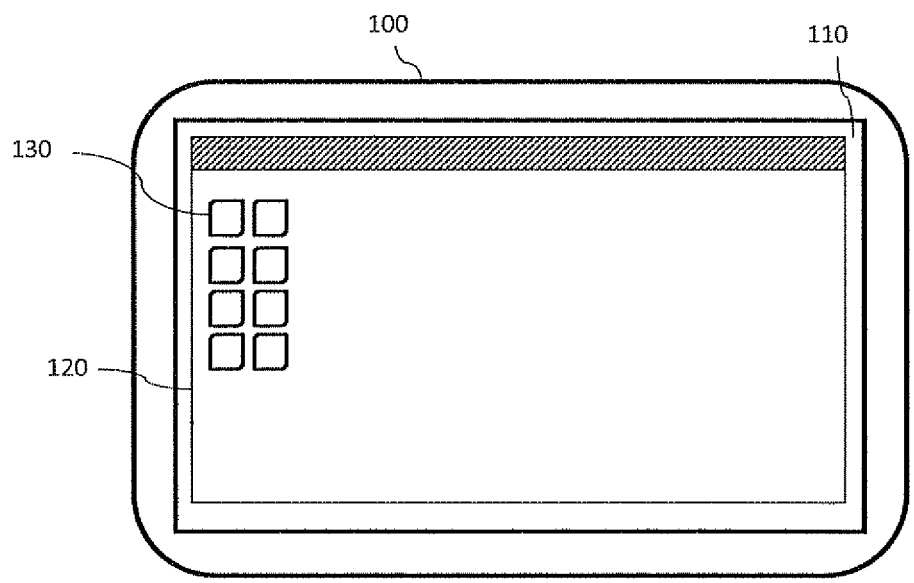
FIG. 2 is a frontal view of a tablet client device displaying a remote desktop according to an embodiment of the present invention.

FIG. 2 illustrates the tablet client device of FIG. 1 configured to display a remote desktop according to a preferred embodiment of the present invention. On client device 100, remote desktop 120 is displayed using a 1:1.4 remote pixel to local pixel ratio and optionally resized to full screen so that remote desktop 120 fills substantially all of display 110, resulting in larger touch targets 130.

Figure 3:
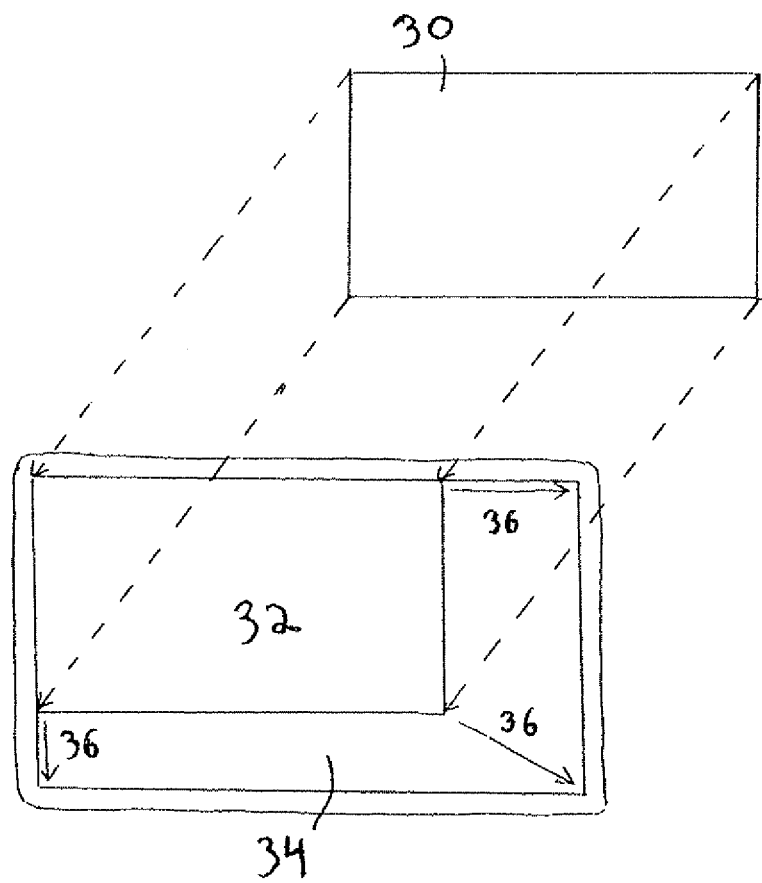
FIG. 3 is a schematic of a view of a remote desktop on a client device after pixel mapping before enlarging.

FIG. 3 illustrates a preferred embodiment of the present invention. Remote display region 30 representing pixels of the remote desktop are mapped, in a non-1:1 ratio to local display region 32 representing client pixels. Local display region 32 is then resized to full screen 36 in order to fill substantially all of the client display 34.

Figure 4:
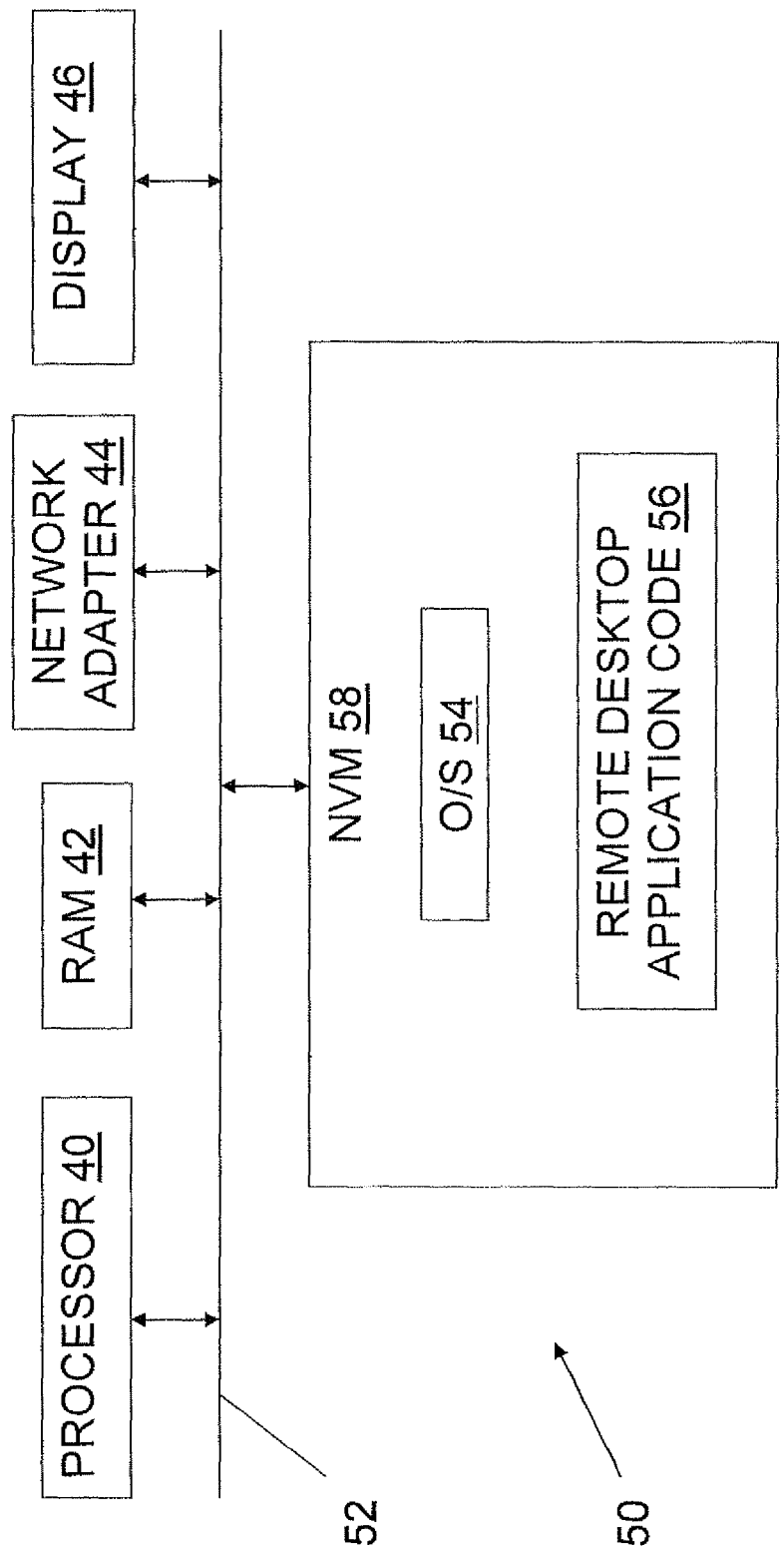
FIG. 4 is a high-level partial block diagram of a client device configured to implement the present invention.

FIG. 4 is a high-level partial block diagram of an exemplary client device 50 configured to implement the present invention. Only components of device 50 that are germane to the present invention are shown in FIG. 4. Client device 50 includes a processor 40, a random access memory (RAM) 42, a non-volatile memory (NVM) 58, a network adaptor 44, and display 46, all communicating with each other via a common bus 52. In NVM 58 are stored operating system (O/S) code 54 and remote desktop application code 56 of the present invention. Under the control of O/S 54, processor 40 loads remote desktop application code 56 from NVM 58 into RAM 42 and executes remote desktop application code 56 in RAM 42 to determine a connection resolution based on properties of display 46 and optionally also a size of a depressed region of display 46. Remote desktop application code 56 then sends via the network adapter 44 a request to a host computer (not shown) for a remote desktop connection. In response to the request, remote desktop application code 56 receives at the network adapter 44 a remote desktop which it then manipulates according to the present invention by mapping remote desktop pixels to local pixels and optionally enlarging to full screen. The resulting image is then sent to display 46.

NVM 58 is an example of a computer-readable storage medium bearing computer-readable code for implementing the data validation methodology described herein. Other examples of such computer-readable storage media include read-only memories such as CDs, DVDs, bearing such code. Alternatively the code may also be stored in a cloud server.

In one embodiment, the remote desktop application of the present invention first queries the client device for its display properties. Display properties can include, for example, the display resolution expressed in terms of the number of pixels horizontally and vertically, screen size in terms of length and width, and pixel density expressed in pixels per inch (ppi).

Alternatively, if it is not possible to query the client device for its display properties, the application can query the client device for its device type. Device type is any device identifier which can be used to uniquely identify the client device the application is running on. It may be the popular name for the device, for example iPad™ 2 or Kindle Fire™, or it may be a manufacturer code, such as a serial number, which can be used to identify the device. Once the device type is known, the display properties of the device can be looked up in a database stored locally on the device itself or remotely on a server.

Once the display properties of the device are known, the remote desktop application of the present invention then calculates a suitable resolution for displaying a remote desktop on the particular client device, and specifies that resolution in the remote desktop connection request. That is, the client device will, using the present invention, initiate a remote desktop connection by sending a host computer a request for a remote desktop connection at the specified resolution (the connection resolution). In most cases, when the client device is a high resolution (high pixel density) tablet or smartphone, a suitable resolution is a lower resolution than the client's default resolution. If however, the client device is an older tablet or smartphone with a low resolution, in terms of pixel density, then a suitable resolution which may be higher than the client's default resolution. Assuming a lower resolution is specified in the request, the remote desktop which is returned is smaller than the client screen and so needs to be enlarged in order to fill the client screen, as illustrated in FIG. 3. However, there may instances where the remote desktop is larger and needs to be reduced. In either case the resizing is accomplished by the application processing the remote desktop by mapping pixels of the remote desktop to pixels of the client device using a pre-determined ratio that is either more or less than 1:1, meaning one pixel of the remote desktop which was returned will be displayed using more or less than one pixel of the client device. For example, we found that a ratio of 1:0.7 works well for a first or second generation iPad™. This means that a single remote pixel is mapped to 0.7 local pixels on each axis. On a third and fourth generation iPad™ a ratio of 1:1.4 works better, due to the much higher resolution and pixel density of those devices. This means that on the newer devices, a single remote pixel preferably occupies more than one local pixel. A suitable ratio may be determined by dividing the desired pixel density for displaying the remote desktop by the client device's physical pixel density. Using the example of a third generation iPad™ with Retina™ display, a ratio of 1:1.4 translates to a display resolution of 1434×1075 and a pixel density of 185 ppi. At 185 ppi, a standard 48×48 pixel Windows™ icon will measure 0.26×0.26 inches on the Retina™ display, large enough for most people to tap comfortably.

In some cases, especially with very small screen devices such as smartphones, some panning will still be required after the pixels are mapped, however the number of pans, zooms, pans, should be significantly decreased.

As a final step, if desired, the remote desktop application may also resin the image of the remote display to fully cover the local device screen. This can be done using an API of the device or by any other method known in the art.

Optionally, the remote desktop application can also be configured to give the user control over how large or small the fonts and icons will appear. In a preferred embodiment of this configuration, the user is initially presented with one or more questions which are designed to get a sense of how large or small touch targets the user would prefer. For example the user can initially be asked questions relating to his or her finger width or eyesight. Depending on the user's answers, the optimal resolution can be adjusted up or down as needed so that the size of the touch targets will be larger or smaller.

In another preferred embodiment, the user may be asked to place a fingertip on the screen and the application, using the sensors in the touch screen, automatically records the physical dimensions of the user's fingertip, which is then used to return a remote desktop optimally sized to the user's fingertip. In this context, optimally sized to the user's fingertip means that a 48×48 pixel icon will measure approximately the same size as the user's fingertip when displayed on the client device.

Optionally, the user can also specify the desired resolution, either before or after the application displays the remote desktop automatically.

It should be understood that once the remote desktop is displayed according to the method of the present invention, there may still be some zooming and panning required during the interaction with remote applications. The present invention seeks to minimize, not eliminate, the amount of zooming and panning required to effectively interact with remote applications.

The following examples illustrate some preferred embodiments of the invention.

EXAMPLE 1

Using a third generation Apple iPad™ as the client device, a user connects to a host running Windows™. The remote desktop application queries the client device for its display properties and finds that the device has a screen resolution of 2048×1536 and a pixel density of 264 ppi. The application then calculates that a resolution of 1434×1075 will result in an effective ppi of 185. The application requests a remote desktop at 1434×1075 and maps the remote pixels to local pixels at a ratio of 1:1.43. That is, one remote pixel is mapped to 1.43 local pixels on each axis. This results in standard Windows™ icons measuring 0.26×0.26 inches on the iPad™ client device. Optionally, as a final step the image can be resized to full screen. In an alternative embodiment, the client can choose to display only a portion of the remote desktop and pan around to view the other portions.

EXAMPLE 2

A user connects to a remote host running Windows™. The application asks the user to choose between "large fonts and icons" or "small fonts and icons". The user chooses "large fonts and icons". Utile appropriate APIs are available, the device is then queried for its display properties. Otherwise, the device is queried for a device identifier. The device identifier is looked up in a database which reveals the client device is a Samsung™ Galaxy S3 smartphone with a resolution of 1280×720 and pixel density 306 ppi. The application calculates that at a resolution of 627×353, standard Windows™ icons will measure 0.32×0.32 inches at a ppi of 150. The application requests a remote desktop at 627×353 and maps the returned pixels to client pixels at a ratio of 1:2.04. In this example, the user is shown on his smartphone a portion of the remote desktop with touch targets large enough to tap. The user then pans around to view the other portions of the desktop.

In the above example, had the user chosen "small fonts and icons", the application may have displayed the remote desktop at a resolution of 913×513, resulting in touch targets that are 0.22×0.22 inches at a ppi of 218.

While the invention has been described with respect to a limited number of embodiments, it will be appreciated that many variations, modifications and other applications of the invention may be made. Therefore, the invention as recited in the claims that follow is not limited to the embodiments described herein.

What is claimed is:

1. A method for displaying a remote desktop on a client device comprising, by the client device:
   (a) selecting, by the client device, at least two physical properties of a display of the client device, the at least two physical properties being selected from a physical size, an X×Y resolution, and a pixel density;
   (b) determining, by the client device, a connection resolution for a remote desktop connection dependent on the at least two selected physical properties of the display of the client device, and, the connection resolution, as determined by the client device, is different than the X×Y resolution of the display of the client device;
   (c) retrieving a remote desktop from a host computer at the connection resolution; and
   (d) mapping pixels of the remote desktop to pixels of the client device at a ratio other than 1:1.

2. The method of claim 1 further comprising resizing the remote desktop to fill substantially all of the display of the client device.

3. The method of claim 1 wherein the pixels are mapped such that the remote desktop is displayed on the client device in an effective pixel density of 140 to 230 pixels per inch.

4. The method of claim 3 further comprising resizing the remote desktop to fill substantially all of the display of the client device.

5. A method for displaying a remote desktop on a touch screen client device comprising, by the client device:
   (a) determining a size of a fingertip of a user of the client device;
   (b) selecting, by the client device, at least two physical properties of a display of the client device, the at least two physical properties being selected from a physical size, an X×Y resolution, and a pixel density;
   (c) determining, by the client device, a connection resolution for a remote desktop connection dependent on the at least two selected physical properties of the display of the client device, and, the connection resolution, as determined by the client device is different than said X×Y resolution of the display of the client device;
   (d) retrieving a remote desktop from a host computer at the connection resolution; and
   (e) mapping pixels of the remote desktop to pixels of the client device at a ratio. other than 1:1 such that a pixel rectangle of a predetermined size on the remote desktop, when mapped to pixels on the client device, has approximately the same dimensions as said fingertip.

6. The method of claim 5 further comprising resizing the remote desktop to fill substantially all of the display of the client device.

7. The method of claim 5 wherein the pixels are mapped such that the remote desktop is displayed on the client device in an effective pixel density of 140 to 230 pixels per inch.

8. The method of claim 5 wherein the fingertip size is determined by the client device by:
   (a) instructing said user to touch the touch screen with a fingertip of the user, thereby depressing a region of the touch screen, and
   (b) measuring a size of said region.

9. A non-transitory computer-readable storage medium having computer-readable code embodied on the computer-readable storage medium, the computer-readable code for displaying a remote desktop on a client device, the computer-readable code comprising a set of instructions that, when executed on the client device, causes the client device to:
   (a) select, by the client device, at least two physical properties of a display of the client device, the at least two physical properties being selected from a physical size, an X×Y resolution, and a pixel density;
   (b) determine, by the client device, a connection resolution to initiate a remote desktop connection dependent on the at least two selected physical properties of the display of the client device, and, the connection resolution, as determined by the client device, is different than said X×Y resolution of the display of the client device;
   (c) retrieve a remote desktop from a host computer at the connection resolution; and
   (d) map pixels of the remote desktop to pixels of the client device at a ratio other than 1:1.

10. The medium of claim 9 further comprising code that when executed causes the client device to resize the remote desktop to fill substantially all of the display of the client device.

11. The medium of claim 9 wherein the pixels are mapped such that the remote desktop is displayed on the client device in an effective pixel density of 140 to 230 pixels per inch.

12. A non-transitory computer-readable storage medium having computer-readable code embodied on the computer-readable storage medium, the computer-readable code for displaying a remote desktop on a client device, the computer-readable code comprising a set of instructions that, when executed on the client device, causes the client device to:
   (a) determine a size of a fingertip of a user of the client device;
   (b) select, by the client device, at least two physical properties of a display of the client device, the at least two physical properties being selected from a physical size, an X×Y resolution, and a pixel density;
   (c) determine, by the client device, a connection resolution for a remote desktop connection dependent on the at least two selected physical properties of the display of the client device, and, the connection resolution, as determined by the client device, is different than the X×Y resolution of the display of the client device;
   (d) retrieve a remote desktop from a host computer at the connection resolution; and
   (e) map pixels of said remote desktop to pixels of the client device at a ratio other than 1:1 such that a pixel rectangle of a predetermined size on the remote desktop, when mapped to pixels on the client device, has approximately the same dimensions as the fingertip.

13. The medium of claim 12 further comprising code that when executed causes the client device to resize the remote desktop to fill substantially all of the display of the client device.

14. The medium of claim 12 wherein the pixels are mapped such that the remote desktop is displayed on the client device in an effective pixel density of 140 to 230 pixels per inch.

15. The medium of claim 14 further comprising code that when executed causes the client device to resize the remote desktop to fill substantially all of the display of the client device.

16. The medium of claim 12 wherein the fingertip size is determined by the client device by:
   (a) instructing the user to touch the touch screen with a fingertip of the user, thereby depressing a region of the touch screen, and
   (b) measuring a size of the region.

* * * * *